Oct. 3, 1967

TAKAYUKI MAKINO ET AL 3,345,564

METHOD FOR NON-DESTRUCTIVE DETECTION AND OBSERVATION
OF DEFFECTS OF FERROMAGNETIC STEELS UTILIZING
AN AQUEOUS FERROMAGNETIC SOLUTION

Filed Sept. 30, 1963

Takayuki Makino
Susumu Kanbe and
Shigeru More, Inventors

By Wenderoth, Lind and Ponack,
Attorneys

United States Patent Office 3,345,564
Patented Oct. 3, 1967

3,345,564
METHOD FOR NON-DESTRUCTIVE DETECTION AND OBSERVATION OF DEFECTS OF FERROMAGNETIC STEELS UTILIZING AN AQUEOUS FERROMAGNETIC SOLUTION
Takayuki Makino, Okazaki, Susumu Kanbe, Hekikai-gun, and Shigeru Mori, Toyohashi, Japan, assignors to Toyota Motors Company, Limited, Toyota, Japan
Filed Sept. 30, 1963, Ser. No. 312,753
Claims priority, application Japan, Oct. 6, 1962, 37/44,400
2 Claims. (Cl. 324—38)

This invention relates to a method for detection and observation of defects in ferromagnetic steels without destroying the steel and more particularly to such a method utilizing a solution of ferromagnetic colloidal material.

In order visually to detect such defects in ferromagnetic materials and articles which have been magnetized, powders of colored magnetic materials or magnetic phosphors have been widely utilized for a long time. This expedient is known as the "Magnaflux" method and is very effective for testing ferromagnetic materials without destroying them. However, this type of conventional test method can be utilized only within a restricted range due to its inconveniences and disadvantages. For example, such methods are inconvenient in that defect patterns detected by the use of the same can not be easily and rapidly transferred to other record media and the patterns can not be preserved for a long period of time after the magnetized ferromagnetic materials and articles have been demagnetized. Also such methods are disadvantageous in that the particle size and magnetic characteristics of the powdered magnetic material and the properties of the testing solution having the material suspended therein which are used with the methods are not suitable for the purpose of detecting very minute defects such as extremely minute fatigue flaws, cutting damage, the degree of abrasion, blowholes, etc, with a high degree of accuracy.

Therefore, the chief object of the invention is to provide an improved method of visually detecting extremely minute defects in ferromagnetic materials or articles which could not be detected by the prior art practice, with both a high degree of accuracy and a high stability.

Another object of the invention is to provide an improved method described in the preceding paragraph, whereby preservation or transfer of a defect pattern obtained to another record medium can be effected in an easy, rapid and stable manner.

According to the teachings of the invention, there is provided a method of visibly detecting defects in a ferromagnetic steel material or member without destroying the same, comprising the steps of affixing a thin layer of non-magnetic record medium on the surface of the ferromagnetic steel material or member to be studied, placing the ferromagnetic steel material or member within a direct current magnetic field to direct-current magnetize the same to thereby form on the surface of the magnetized ferromagnetic steel material or member a latent magnetic image corresponding to the type and distribution of defects in the material or member, applying a ferromagnetic colloidal liquid developer including a very finely divided ferromagnetic material to the exposed surface of the non-magnetic record medium on the magnetized steel material or member to develop a defect pattern comprising a powder image corresponding to the latent magnetic image on the exposed surface of the record medium, and thereafter drying and fixing the defect pattern on the layer of the record medium.

The ferromagnetic colloidal liquid developer preferably includes, by weight, from 0.5 to 1.5% of a very finely divided magnetite ($Fe_3O_4$) with the particles having an average diameter on the order of $0.02\mu$ admixed with an aqueous solution consisting of from 3 to 10% of a water-soluble diffuser such as a pure potash soap, from 5 to 10% of a volatile water-soluble solvent such as ethyl alcohol or ethyl acetate, from 0.1 to 0.3% of a water-soluble fixing agent such as a polyvinyl alcohol or gum arabic, and the balance water.

The invention will become more readily apparent from the following detailed description taken in conjunction with the accompanying drawings in which.

In practicing the invention, a finely divided magnetite having particles with an average diameter on the order of $0.02\mu$ is thoroughly admixed with a solution which will be described hereinafter to form a solution of ferromagnetic colloidal material or a liquid developer. This ferromagnetic colloidal liquid developer plays an important role in practicing the invention so that processes of preparing the same will be described in detail hereinafter. Then a surface of that portion of a body of magnetic steel material destined to be tested is coated with a thin layer of any suitable rapid cure paint composition having a light color, for example, white, for a purpose which will be apparent later. Alternatively, said surface portion of the body of ferromagnetic steel material can have applied thereto a non-magnetic material in the form of a foil or a film which can be later removed. The term "body of ferromagnetic steel material" used herein includes ferromagnetic steel materials themselves and ferromagnetic steel members. Thereafter the body of ferromagnetic steel material thus prepared is placed in a direct current magnetic field to be direct-current magnetized along the initial magnetization curve for the ferromagnetic material of the body. The initial magnetization curve can be readily determined in the manner described in the copending U.S. application Ser. No. 146,496, now Patent No. 3,281,666, entitled "System of Testing Hardened Steel Articles," filed Oct. 23, 1961 in the name of Takayuki Makino. In order to direct-current magnetize the body of ferromagnetic steel material as above described, the arrangement shown in FIG. 1 of the drawings can be conveniently used.

Figure 1:
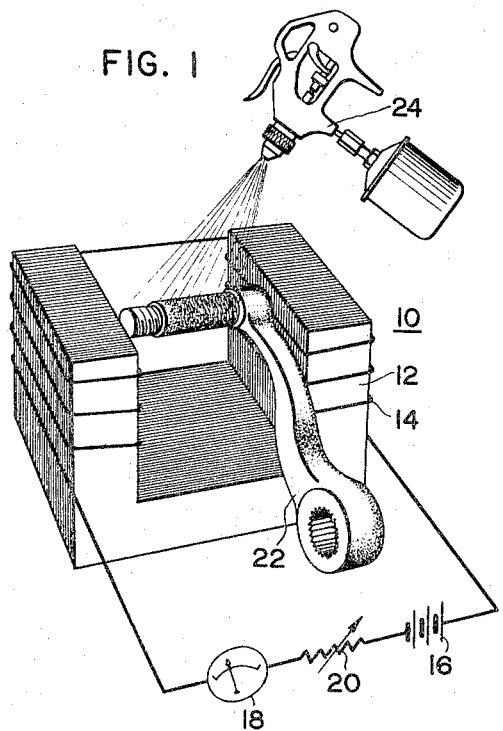
FIG. 1 is a perspective view illustrating a manner in which a specimen to be tested has been magnetized in a direct current magnetic field and is being sprayed with a ferromagnetic colloidal liquid developer.

Referring now to FIG. 1, there is illustrated a reactor device generally designated by the reference numeral 10 and including a substantially U-shaped magnetic core 12 and an exciting winding 14 inductively disposed on a pair of leg portions of the core. The exciting winding 13 has one end electrically connected to one terminal of a source of direct current 16 and the other end electrically connected to the other terminal of the source 16 through an ammeter 18 and an adjusting resistor 20. When the exciting winding 14 is energized by the source 16 a direct current magnetic field is established around the pair of leg portions of the magnetic core 12. Under these circumstances, the abovementioned body of ferromagnetic steel material such as a mechanical component 22 can be put in the direct current magnetic field thus established to be magnetized. It is to be understood that, as previously described, the mechanical component is magnetized along the initial magnetization curve for the ferromagnetic material of the mechanical component. This can easily be accomplished by controlling the adjusting resistor 20 while observing the ammeter 18 and based upon the initial magnetization curve preliminarily obtained. Thus it will be readily understood that the magnetized mechanical component has on the magnetized surface a latent magnetic image corresponding to or comprising the portions thereof which have been differently magnetized depending upon the type and distribution of defects. In this connection it will be appreciated that, if the mechanical component is disposed in the magnetic field in such a manner that the magnetic flux flows through that portion of the mechanical component where defects as previously described may be present, in a direction substantially perpendicular to the same then the ability of the method to detect defects will be naturally increased to its maximum.

In order to develop the latent magnetic image as above described, the ferromagnetic colloidal liquid developer as already outlined can now be sprayed on the magnetized body of ferromagnetic steel material, for example by a spray gun 24, either while maintaining the body disposed in the magnetic field or after it has been removed from the field. It is recalled that either the thin layer of non-magnetic paint composition or the non-magnetic foil or film has been applied to the surface of the body of ferromagnetic steel material to be tested. Therefore, because of magnetic attraction, the liquid developer sprayed onto the body is deposited on the exposed surface of the layer of foil or film as the case may be, in such a manner that the ferromagnetic colloidal particles in the developer are attracted by and collected on the defecting portions by the action of leakage magnetic fields produced on those portions due to the magnetization of the body being tested. Thus a defect pattern corresponding to the latent magnetic image is formed on the thin film of the body. Then the defect image thus formed on the layer or foil is allowed to dry and be fixed on the same. As will be explained later, the liquid developer includes an alcohol component so that the defect image is formed rapidly by natural drying by the action of the alcohol component. If it is required to dry the powder image more rapidly any suitable infrared dryer can be used which can dry the same within several seconds.

The defect image or defect pattern is firmly fixed on the layer of white non-magnetic paint composition or on the non-magnetic foil or film by the action of the polyvinyl alcohol or gum arabic included in the solution of ferromagnetic colloidal liquid developer as will be described later. It will therefore be appreciated that, after the tested body has been demagnetized the defect pattern can be preserved for an indefinite period of time as desired. When the defect pattern has been formed on the surface of the non-magnetic foil or film the latter can be easily stripped from the defect pattern. Then the defect pattern can be transferred onto any suitable record media by any conventional transfer technique. It is to be noted that the defect pattern on the foil or film can be erased simply by rinsing the same with water.

The invention is practiced in the manner thus far described. In practicing the invention it is to be noted that the ferromagnetic colloidal liquid developer plays an important role. Therefore, its preparation will now be described in detail.

Appropriate amounts of ferric chloride, ferrous chloride and sodium hydroxide are admixed with one another and stirred at a high speed at a temperature of from approximately 30° to 35° C. within a magnetic stirrer with a water bath equipped with an automatic temperature controller to thereby form a very finely divided magnetite ($Fe_3O_4$) the particles of which have an average diameter on the order of $0.02\mu$. A refined liquid containing the magnetite thus formed is prepared and filtered to obtain finely divided particles of magnetite. The resulting are suitably washed whereby chloride ions included in the magnetite are completely removed from the same resulting in a satisfactory ferromagnetic colloidal material. In order to produce a liquid developer or the solution of ferromagnetic colloidal material, the colloidal magnetite thus produced is admixed with a solution having a composition including from 3 to 10% by weight of a water-soluble diffuser such as a pure potash soap, from 5 to 10% by weight of a volatile, water-soluble solvent such as ethyl alcohol, or ethyl acetate, from 0.1 to 0.3% by weight of a water soluble fixing agent such as a polyvinyl alcohol or gum arabic and the balance water. The water-soluble diffusing agent such as pure potash soap serves to complete fine division of the magnetite and to aid in diffusing the same with the result that the ability to detect defects is improved. It has been found that the pH value of the solution is on the order of 10 for satisfactory results. The fixing agent such as a polyvinyl alcohol or gum arabic serves to form a thin film on the resulting defect pattern permitting the pattern to be preserved for an indefinite period of time as desired. Because of its water-soluble property the use of this fixing agent is advantageous in that the defect pattern can be erased simply by rinsing the same with water, if it is desired to do so. The volatile solvent comprising an alcohol is used for the purpose of aiding in rapidly drying the surface to be tested. The solution has added thereto the colloidal magnetite in an appropriate proportion of from 0.5 to 1.5% by weight to complete the ferromagnetic colloidal liquid developer. A preferred example of the solution has on the order of 5% by weight of a pure potash soap about 0.1% by weight of a polyvinyl alcohol or gum arabic, about 10% by weight of ethyl alcohol and the balance water. It has been found satisfactory to use on the order of 1 g. of the colloidal magnetite per 100 cc. of the solution.

Observation through an electronic microscope indicated that the ferromagnetic colloidal material extracted from the liquid developer prepared according to the invention has quite different properties from the prior art type of magnetic powders used for the purpose of detecting flaws. Namely it is high in its ability to diffuse and is entirely in a very finely divided state as compared with a magnetic powder presently considered as having the highest sensitivity and the smallest average diameter among the magnetic powders widely used to detect flaws. This proves that the liquid developer of the invention has excellent characteristics especially suitable for use in flaw detection.

From the results of numerous experiments it has been found that the liquid developer of the invention as previously described is very sensitive to the presence of flaws and therefore high in its ability to detect flaws, power of resolution for transfer and ability to fix defect patterns on record media. Also it has been found that by the use of the invention it is possible to observe very minute defects which could not be detected by the prior art practice.

Figure 2:
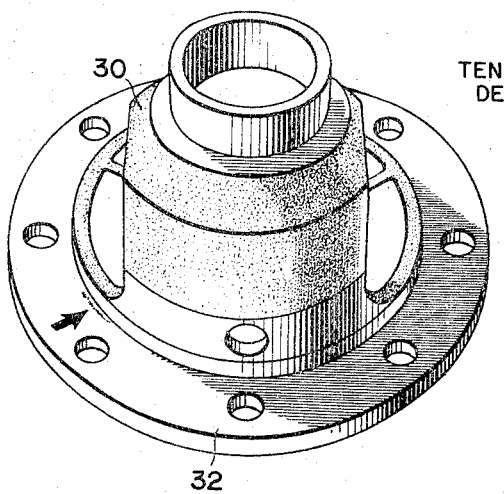

Referring now to FIG. 2, there is illustrated a cast member for use in an automobile, which member has been tested according to the method of the invention. The tested member 30 includes a flange 32 where a defect pattern is shown at the arrow in FIG. 2 was developed on a non-magnetic layer coated on the same. That portion of the flange having the defect pattern was cut along the arrow and observed by a microscope having a magnification factor of 100. Then it was found that a minute decay portion was present in the interior of the tested member corresponding to the defect pattern. In this way, the method of the invention can precisely detect any defects. Therefore, the invention is very advantageous in that a comparison of defect patterns obtained before and after a particular mechanical member is used permits a cause of a fatigue flaw to be definitely determined.

Figure 3:
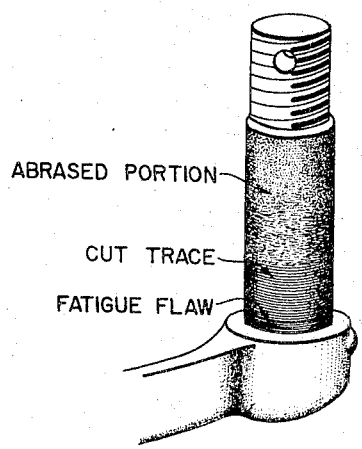
FIGS. 2, 3 and 4 show various articles treated according to the method and the results of tests conducted in accordance with the teachings of the invention.

FIG. 3 shows another cast member for use in an automobile tested according to the invention for the purpose of determining cutting damage, fatigue flaw and the abraded condition state thereof. As clearly shown in FIG. 3, the defect pattern obtained obviously indicates cutting traces, fatigue flaws and abraded portions of the tested member. (It will be seen that cutting traces disappeared on the abraded portion.) Thus the invention is advantageous in that, after service the condition of any mechanical member can be determined.

Figure 4:
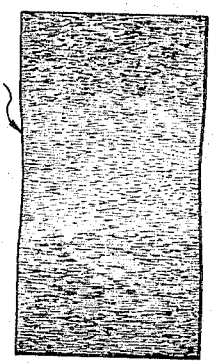

FIG. 4 shows the surface of a sheet of automobile steel which has been subject to a stress exceeding its elastic limit. The defect pattern illustrated was prepared as follows: After a specimen cut from such a sheet of automobile steel was stressed as just described a non-magnetic film was attached to one surface thereof. Then the specimen was treated in the manner as previously described whereby a defect pattern was developed on the foil and thereafter it was transferred to a separate record medium. It will be appreciated that the stress hysterisis is readily presumed.

Also the invention is equally usable for the purposes of detecting very minute working damages to a mechanical member occurring during manufacturing of the same and for observing magnetized conditions of ferromagnetic materials.

From the foregoing it will be appreciated that the invention has extended the field of non-destructive test methods used with various steel materials and articles which presently play important roles in commercial production. Unlike the prior art type of test methods principally aimed at flaw detection alone, the invention can carry out effective non-destructive test such as determination of causes by which defects are formed, estimation of abrasion, observation of magnetized condition, etc.

What we claim is:

1. A method of precisely and visually detecting defects in a body of ferromagnetic steel material without destroying the material, said method comprising the steps of placing said body of ferromagnetic steel material within a direct current magnetic field to magnetize the body of ferromagnetic steel material to form on that surface of the body of ferromagnetic steel material in which defects are to be detected, a latent magnetic image corresponding to the type and distribution of defects in said body of steel material, and placing a detecting aqueous solution of ferromagnetic type on the said surface of said steel material to be tested to develop a defect pattern corresponding to the latent magnetic image on said surface of said steel material to be tested, said solution including, by weight, from 0.5 to 1.5% of a very finely divided colloidal magnetite ($Fe_3O_4$) the particles of which have an average diameter in the order of $0.02\mu$, from 3 to 10% of potash soap, from 5 to 10% of a solvent selected from the group consisting of ethyl alcohol and ethyl acetate, from 0.1 to 0.3% of a fixing agent selected from the group consisting of polyvinyl alcohol and gum arabic and the balance water and drying and fixing said defect pattern on said surface of said steel material.

2. A method of precisely and visually detecting defects in a body of ferromagnetic steel material without destroying the material, said method comprising the steps of applying a thin layer of non-magnetic record medium to the surface of the body of ferromagnetic steel material in which defects are to be detected, placing said body of ferromagnetic steel material with said thin layer of non-magnetic record medium within a direct current magnetic field to magnetize the body of ferromagnetic steel material to form on said surface of said material to be tested a latent magnetic image corresponding to the type and distribution of defects in said body of steel magnetic material, and placing a detecting aqueous solution of ferromagnetic type on the exposed surface of said non-magnetic record medium on the magnetized body of steel material to develop a defect pattern corresponding to the latent magnetic image on the exposed surface of the record medium, said solution including, by weight, from 0.5 to 1.5% of a very finely divided colloidal magnetite ($Fe_3O_4$) the particles of which have an average diameter in the order of $0.02\mu$, from 3 to 10% of potash soap, from 5 to 10% of a solvent selected from the group consisting of ethyl alcohol and ethyl acetate, from 0.1 to 0.3% of a fixing agent selected from the group consisting of polyvinyl alcohol and gum arabic and the balance water and drying and fixing said defect pattern on said surface of said steel material.

References Cited

UNITED STATES PATENTS

| 2,106,882 | 2/1938 | Betz | 252—62.5 |
| 2,236,373 | 3/1941 | Kowalski | 324—38 |
| 3,198,603 | 8/1965 | MacCallum et al. | 252—62.5 |

FOREIGN PATENTS

| 617,792 | 2/1949 | Great Britain. |
| 797,335 | 7/1958 | Great Britain. |
| 833,884 | 5/1960 | Great Britain. |

OTHER REFERENCES

Pevar, Maxwell, New Magnetic Test Includes Stainless Steels, Product Engineering, Feb. 6, 1961, pp. 41–43, copy in 29–417.

RUDOLPH V. ROLINEC, Primary Examiner.

RICHARD B. WILKINSON, WALTER L. CARLSON, Examiners.

R. J. CORCORAN, Assistant Examiner.